United States Patent Office 3,410,813
Patented Nov. 12, 1968

3,410,813
COMPOSITION BOARD MADE FROM MATERIAL PRETREATED WITH A FLUXED WATER REPELLENT
Craig C. Campbell, John W. Schick, and John H. Stockinger, Cherry Hill, N.J., assignors to Mobil Oil Corporation, a corporation of New York
No Drawing. Continuation-in-part of application Ser. No. 397,267, Sept. 17, 1964, which is a continuation-in-part of application Ser. No. 316,505, Oct. 16, 1963. This application Mar. 30, 1966, Ser. No. 538,612
12 Claims. (Cl. 260—17.2)

ABSTRACT OF THE DISCLOSURE

Composition boards are formed from fibers, particles, and mixtures of fibers and particles that have been pretreated with a water-repellent material. The fibers and/or particles, generally cellulosic, are coated with water-repellent material such as wax emulsion and then heated to flux the water-repellent material over the particle surface. A catalyst for a thermosetting resin can also be placed on the particle surfaces. Then the pretreated particles and/or fibers are admixed with a thermosetting resin, molded to form composition board, and heated to thermoset the thermosetting resin.

Composition Board

This application is a continuation-in-part of copending application Ser. No. 397,267, filed Sept. 17, 1964, now abandoned, which in turn is a continuation-in-part of application Ser. No. 316,505, filed Oct. 16, 1963, now abandoned.

This invention is concerned with composition boards made from particles and/or fibers bonded with a thermoset resin, and to a method for producing such composition boards. It is more particularly concerned with composition boards containing particulate or fibrous material, or both, bonded with a thermoset resin and having high bond strength and enhanced resistance to water, and to a method for producing such composition boards.

As is well known to those familiar with the art, a wide variety of composition boards have been produced by bonding composition board-forming materials with suitable binders. Such boards include chip board, particle board, and fiber-board. In this specification and the claims, "composition board-forming materials" are materials such as fibers, particles, and mixtures of fibers and particles. The terms "fibers" and "particles" encompass a wide variety of materials of mineral and vegetable origin, and synthetic organic fibers like Dacron and nylon. Typical minerals from which such board-forming materials can be made include gypsum, asbestos, fiberglass, and the like. Generally, however, composition boards are made by bonding fibers and/or particles of vegetable origin, usually cellulosic materials, into desired configurations. The term "cellulosic," as used herein, is embracive of various plants and trees that contain the lignocellulosic complex. Within the term "cellulosic materials," therefore, as used herein, are contemplated fibers, chips, shavings, sawdust, and the like derived from various plants and trees, including hard woods, soft woods, cotton, bagasse, kenaf, hemp, and jute.

A variety of materials have been proposed for use as binders for fibers and particles. Materials that can be thermoset to provide an infusible binder, i.e., "thermosetting resins," lending greater strength and durability to the bonded products are highly desirable. Phenol-formaldehyde, urea-formaldehyde, and melamine-formaldehyde resins are among the numerous thermosetting resins that have been proposed for such uses.

In the manufacture of composition boards with a thermosetting resin, the resin is generally mixed with a solvent for application to the particulate or fibrous board-forming material as a solution or a paste-like slurry. Accordingly, the viscosity of the resin can be an important factor in such uses. If the resin is too thin, there will be a tendency for it to penetrate into the pores of the fibers or particles being bonded, particularly when subjected to a high cure temperature. By such penetration, resin will be removed from the glue line at which the particles of fibers are bonded, resulting in a "starved glue line" having poor bond strength. This was particularly apparent in tests involving ketone-aldehyde resins. A water solution of an acetone-formaldehyde resin, for example, should have a Gardner-Holt viscosity (ASTM D1545-60) at ambient temperatures of at least 5 seconds to avoid excessive penetration of the pores and substandard bond strength. Even when resins of lower viscosity are applied together with a wax emulsion (a standard practice to increase water resistance of composition boards), bond strength and water resistance of the board are generally substandard.

When composition boards are made from vegetable fibers, particularly bagasse, it has been found necessary to remove the pith. Pith is the soft central portion of the stalk, which contains short fiber and residual sugars. Conventional methods for bagasse processing require depithing, since by conventional standards the short fiber pith causes high water absorption and contributes nothing to the strength of the board. The depithing operation results in a loss of, reportedly, 30–50% of the bagasse. More significantly, depithing operations are relatively expensive. Typical depithing methods are described, for example, in "New Developments in Sugar Cane Bagasse Pulping" by Joseph E. Atcheson, Paper Trade Journal, pages 30–36, May 13, 1963. It will be appreciated that, if composition boards could be made from raw bagasse, i.e., bagasse that has not been depithed, there would be significant savings from the elimination of depithing cost and complete utilization of the bagasse.

It has now been found that composition boards having improved bond strength and water resistance can be produced simply and economically. It has been discovered that such improved composition boards can be made, provided that the fibers and particles used in their manufacture are pretreated with wax or other water repellent material, as described hereinafter. It has also been discovered, in accordance with this invention, that composition boards can be successfully prepared from raw bagasse.

Accordingly, it is a broad object of this invention to provide improved composition boards. Another object is to provide composition boards with enhanced water-resistance. A specific object is to provide composition boards made with thermosetting resin binders, that have increased bond strength and enhance water resistance. Another specific object is to provide such composition boards made from raw bagasse. Other objects and advantages of this invention will become apparent to those skilled in the art, from the following detailed description.

In general, the present invention provides composition boards, comprised of composition board-forming materials bonded with a thermosetting resin binder, that have high bond strength and water resistance greater than that of boards generally regarded as standards for such composition boards. characterized in that, prior to applying said thermosetting resin to said composition board-forming materials, said board-forming materials are coated with a water-repellent substance and heated to an elevated temperature sufficient to flux and uniformly distribute said substance on said material.

This invention also provides a method for producing composition board that comprises coating composition board-forming material with water-repellent material; heating at an elevated temperature sufficient to flux and uniformly distribute the water-repellent material on said composition board-forming material; thereby obtaining treated board-forming material; admixing treated material with thermosetting resin binder and molding to a composition board; and heat curing said thermosetting resin binder.

The method of the present invention is broadly applicable to the manufacture of composition board using thermosetting resins and particulate and/or fibrous materials. The use of the improved method of this invention results in greatly enhanced water resistance of the composition board product. Particularly in conjunction with the use of a thermosetting resin having a relatively low viscosity, which would otherwise penetrate excessively into pores of the particles or fibers and result in a starved (unacceptably weak) glue line, the method of the present invention significantly increases the bond strength of the composition board produced, as well as enhancing the resistance of the bond against weakening from exposure to water.

The thermosetting resins useful in the method of this invention include any resins which can be cured, with the application of heat, to a binder which is infusible and water-insoluble. As stated hereinbefore, phenol-formaldehyde, urea-formaldehyde and melamine-formaldehyde are examples of such resins. Also particularly useful in the practice of the present invention are ketone-aldehyde resins, e.g., the water-soluble ketone-aldehyde resins described in copending application Ser. No. 310,920, filed Sept. 23, 1963, resins containing a ketone, an aldehyde and at least one phenolic compound or derivative, e.g., the water-soluble ketone-aldheyde-phenol resins described in copending application Ser. No. 354,435, filed Mar. 24, 1964, and resorcinol modified ketone-aldehyde-phenol resins described in copending application Ser. No. 369,008, filed May 20, 1964.

The ketone-aldehyde resins described in Ser. No. 310,920 are produced by condensing a ketone reactant and an aldehyde reactant in the presence of a catalytic amount of ammonia or ammonium hydroxide. The reaction by which the water-soluble ketone-aldehyde resins of Ser. No. 310,920 are produced is a condensation reaction which is catalyzed by either ammonia or ammonium hydroxide, with the amount of such catalyst used being between about 0.05 mole and about 0.2 mole per mole of ketone reactant. The ketone and aldehyde reactants are reacted under condensation conditions in a ratio of between about one mole and about two moles of aldehyde reactant per mole of ketone reactant, with a ratio slightly in excess of one mole of aldehyde per mole of ketone being preferred.

The ketone-aldehyde-phenol resins described in Ser. No. 354,435 are produced by condensing an aldehyde, a ketone and a phenol in the presence of a base capable of catalyzing the condensation reaction. The reaction by which the water-soluble ketone-aldehyde phenol resins of Ser. No. 354,435 are produced is a condensation reaction conducted in the presence of a base capable of catalyzing the condensation reaction, and in which the ketone, aldehyde and phenol are reacted in molar proportions of between about 2 and about 8 moles of the aldehyde per mole of the phenol and of between about 0.5 and about 2 moles of the ketone per mole of the phenol.

The resorcinol modified ketone-aldehyde-phenol resins of Ser. No. 369,008 are prepared similarly to those of Ser. No. 354,435, except that part of the phenol reactant is replaced with resorcinol. Usually between about one and about 25 mole percent of the total phenolic compounds will be resorcinol.

The ketone reactant used in preparing the resins of Ser. Nos. 310,920; 354,435; and 369,008 can be any ketone having at least one hydrogen atom on each carbon atom alpha to the carbonyl group, including aliphatic (particularly lower alkyl) and cycloaliphatic ketones, e.g., acetone, methyl ethyl ketone, ethyl ketone, methyl propyl ketones, methyl butyl ketones, ethyl propyl ketones, dihexyl ketones, cyclohexanone, acetonyl acetone, diacetone and mixtures of any of the foregoing ketones. Of the foregoing acetone, methyl ethyl ketone and other ketones having alkyl groups containing up to three carbon atoms attached to the carbonyl group are particularly preferred.

The aldehyde reactant used in the preparation of resins of Ser. Nos. 310,920; 354,435; and 369,008 can be any compound having an active

group characteristic of the aldheydes, including aliphatic, aromatic and heterocyclic aldehydes, e.g., formaldehyde (including polymeric forms, e.g., paraformaldehyde), acetaldehyde, propionaldehyde, butyraldehyde, acrolein, crotonaldehyde, tiglaldehyde, benzaldehyde, salicylaldehyde, cinnamaldehyde, glyoxal, and mixtures of any of the foregoing aldehydes. Of the foregoing, formaldehyde is a preferred aldehyde reactant.

The phenolic reactant used in the preparation of resins of Ser. Nos. 354,435 and 369,008 can be any phenolic compound having hydrogen atoms in at least two and preferably at least three active nuclear positions, including unsubstituted phenol and substituted phenols such as alkylphenols (in which the alkyl groups are preferably lower alkyl), e.g., cresols, xylenols, ethylphenols, propylphenols, butylphenols, amylphenols, phenylphenols, cyclohexylphenols and mixtures of any of the foregoing phenols. Of the foregoing, meta-substituted phenols, various para-substituted phenols (e.g., p-amino phenol), mono-phenols of lower molecular weight and phenols which are relatively unencumbered against ring reactions are preferred phenolic reactants.

In the manufacture of composition board using any of the aforedescribed thermosetting resins, a solution or slurry containing the resin and a thermosetting catalyst are combined with the board-forming particles and/or fibers. After the combined mass has been molded into a desired configuration, heat and pressure are applied to cure the resin to an infusible, water-insoluble binder. In general, and particularly with reference to the aforementioned water-soluble ketone-aldehyde and ketone-aldehyde-phenol resins, it is most desirable that the viscosity of the resin-containing solution or slurry as applied to the boardforming material should be between about five seconds and about nine seconds as measured by the Gardner-Holdt method (ASTM Designation D1545–60) at ambient temperature (about 77° F.). Resins having viscosities below five seconds can also be used in accordance with the method of this invention to produce composition board characterized by good resistance to weakening from exposure to water.

In cases wherein the product of the resin-forming condensation reaction has proper resin concentration and proper viscosity, it can be used in the manufacture of composition board without further modification. In such a case, the resin-synthesis catalyst already present in the product mixture may suffice as the catalyst for the thermosetting reaction. Otherwise, the resin concentration of the solution can be adjusted, e.g., by dilution or evaporation. If desired, the condensation catalyst present in the resin-containing solution can be neutralized and additional catalyst or a different catalyst can be used for the thermosetting reaction. With some resins, such as urea-formaldehyde, an acidic thermosetting catalyst, e.g., an ammonium halide or a hydrochloride of a primary, secondary or tertiary amine or of a heterocyclic base, can be used. With many other resins, such as the ketone-aldehyde and ketonealdehyde-phenol resins described hereinabove, the thermosetting catalyst is generally a basic compound, such as an alkali or alkaline earth metal hydroxide (e.g., NaOH, KOH or Ca(OH)$_2$), a dialkylamine (e.g., dimethylamine or diethylamine), an alkylenediamine (e.g., ethylenediamine), a polyethylene amine (e.g., diethylenetriamine or triethylenediamine) or an alkyleneimine (e.g., pyrroline, pyrrolidine, piperidone or piperazine). The amount of catalyst used to cure the resin is generally between about 0.5 percent and about 12 percent, based on the weight of the resin. Generally, about 2 percent is satisfactory.

As mentioned hereinbefore, the composition boards of this invention include particle board and fiber board. They are both prepared by the same general method of applying the thermosetting resin to the fibers or particles and then heating the combined mass under pressure. Before the resin is combined with the particulate and/or fibrous material, the moisture content of the latter should be reduced, if necessary, to a level which will not excessively inhibit the condensation reaction by which curing of the resin occurs.

The level below which the moisture content should be reduced often depends on the characteristics of the resin to be used. For example, a moisture level slightly below about 6 percent is desired for curing an acetone-formaldehyde resin of the types described generally hereinbefore as ketone-aldehyde resins and having a molecular weight of about 400, while a moisture content below amount 8 percent is sufficiently low for curing a phenol-formaldehyde resin having a molecular weight of about 2000. Generally, such a reduction of the moisture content can be accomplished by drying the particles or fibers at a temperature below about 250° F., usually about 220° F., for between about ten minutes and about 24 hours, depending on their original moisture content and on the capacity of the dryer used.

In accordance with the method of this invention, the particles or fibers used to make the composition board are treated, prior to their combination with the thermosetting resin, with a water-repellent substance. For example, the particles or fibers can be sprayed with a water-repellent substance such as silicone oils, petroleum oils, or wax. Wax is a preferred water-repellent substance for present purposes, and the method of treating is hereinafter described in some instances with particular reference to the use of wax as the water-repellent substance, although the method of this invention is not limited thereto. Treatment of the particulate or fibrous material with the water-repellent substance can be carried out either before, after, or during reduction of the moisture content of the material. However, for reasons explained hereinafter, it is particularly advantageous to treat the particulate and/or fibrous material with the water-repellent substance before or during elevation of the temperture of the material for dehydration purposes.

When wax is used as the water-repellent substance, the particles or fibers are generally sprayed with a wax-containing emulsion (e.g., an aqueous emulsion) in an amount containing between about 0.25 percent and about 5 percent wax, based on the weight of the particles or fibers to which it is added. The preparation of suitable wax emulsions is well known to the art and such emulsions are commercially available. Any suitable type of wax, including those obtainable from petroleum or lignite or by the Fischer-Tropsch synthesis process or from esters of carboxylic acids of high molecular weight can be used, but generally a petroleum wax such as a paraffin wax, a microcrystalline wax or slack wax will be used.

In accordance with this invention, the particulate or fibrous material is heated, following treatment or coating with a normally solid water-repellent substance, to a temperature at which the water-repellent substance is sufficiently fluidized for more even distribution on the surfaces of the particulate or fibrous material, to more effectively close the porous openings of the material against entry of the thermosetting resin to be subsequently applied. The specific temperature used in such heat-treatment will accordingly depend on a property of the specific water-repellent substance employed, i.e., the lowest temperature at which it will melt or soften enough for fluxing and more even distribution on the particulate or fibrous material surfaces. In view thereof, this specific embodiment of the invention broadly encompasses the use of water-repellent substances which will be sufficiently fluidized for such purposes at any temperature which is tolerable in the board-forming process, e.g., when cellulosic board-forming material is being used, any temperature up to that temperature (about 450° F.) at which the cellulosic board-forming material would be caused to char. For convenience, there will generally be used a water-repellent substance having a melting or softening point between about 120° F. and about 200° F. In general, however, petroleum-derived microcrystalline waxes have coagulation temperatures in the range of from about 120° F. to about 200° F., and paraffin waxes have coagulation temperatures in the range of from about 100° F. to about 200° F.

It will be seen that the temperatures necessary for heat-fluxing many of the waxes useful in the method of this invention are lower than temperatures identified hereinbefore as suitable for drying of the particulate and/or fibrous material usually necessary before addition of the resin. Accordingly, heat-fluxing of the water-repellent substance on the surfaces of the particles and/or fibers can be advantageously accomplished by treating the particles with the water-repellent substance either prior to or during elevation of their temperature for dehydration purposes, with heat-fluxing of the wax and drying of the particles and/or fibers thereafter taking place wholly or partly simultaneously. For example, fibers or chips can be dried to a moisture level above that ultimately desired, and while the chips are at the elevated drying temperature, the wax can be applied thereto in the form of an aqueous solution or emulsion (temporarily raising the moisture level of the chip-containing mass); thereafter, continued heating of the mass at the elevated drying temperature (up to 250° F., usually about 220° F.) will simultaneously flux the wax on the surfaces of the particles and complete the reduction of the moisture content of the mass to the level desired below about 6 percent, prior to the addition of the thermosetting resin.

In another embodiment of the invention, the particulate or fibrous board-forming material is treated with a water-repellent substance and with a resin curing catalyst prior to combination of the board-forming material with a thermosetting resin. This embodiment has the advantage that, since the resin curing catalyst is combined with the board-forming material prior to addition of thermosetting resin thereto, the resin and the catalyst do not contact each other sooner than is necessary in the board-forming process. Accordingly, the danger that the catalyst could cause premature setting of the resin before it is combined with the particles or fibers, as sometimes happens in the heretofore customary practice of combining the resin and the catalyst prior to their addition to the board-forming material, is avoided in this embodiment. The resin curing catalyst can be applied to the particles or fibers in this embodiment either before or following their treatment with a water-repellent substance, or it can be applied as a constituent of the emulsion containing the water-repellent substance. If it is applied following treatment of the board-forming material with a water-repellent substance, the resin curing catalyst can be applied in this embodiment either before, during or following heat-treatment of the water-repellent substance to improve its distribution on the surfaces of the particles or fibers. In one specific embodiment, the water-repellent substance and resin curing catalyst are combined in an emulsion which is sprayed on fibers or particles which are partially dried, after which further heating improves the distribution of the water-repellent substance and completes drying of the mixture to the desired moisture level, while the catalyst is retained on the surfaces of the dried fibers or particles.

Following preparation of particulate or fibrous material according to the aforedescribed method, it is combined with a thermosetting resin and, if it is not already present in the particle or fiber-containing mass, a curing catalyst. The resin-coated particles or fibers are then generally placed in a molding press in which they are molded into a compact mass of desired size and shape by the application of heat and pressure. The compactness, density and hardness of the product particle board or fiber board is governed to a great extent by the amount of pressure used. In general, pressure between about 50 p.s.i. and 800 p.s.i. are employed. Molding is usually carried out at temperatures between about 300° F. and about 425° F. If the board contains cellulosic material, the molding temperature should not exceed temperatures in the order of about 450° F., above which charring may occur. The preferred molding time will be dependent upon the temperature and the flow characteristics of the resin being cured. Time should be allowed to permit the resin to be distributed evenly and to cure sufficiently to provide a board of substantially uniform strength. The period of time can be between about 3 minutes and about 1 hour. In general practice, molding time will be between about 5 minutes and about 15 minutes.

The amount of resin applied to the fibrous and/or particulate material to make the composition board should be sufficient that the finished board will contain, by weight, between about 2 percent and about 30 percent of thermoset resin. If desired, e.g., for economic reasons, resins generally used in manufacture of the composition board of this invention can be extended by adding a filler thereto prior to the thermosetting step. Fillers suitable for this purpose, including clay, wood flour, soya flour and dried blood, can be added in relatively large proportion without impairment of the properties of high bond strength and resistance to bond weakening from the action of water which characterize the composition board produced by the method of this invention.

The following examples are for the purpose of illustrating the preparation of the composition board of this invention. It will be understood that this invention is not limited to the specific board-forming materials, resins, water-repellent substances or catalysts used in the examples, or to the particular operations and manipulations involved. Other board components, as exemplified thereinbefore, and other board-forming techniques can be employed within the scope of the present invention, as those skilled in the art will readily appreciate.

Example 1

Eleven hundred and sixty grams of acetone, 810 g. formaldehyde solution (37% $CH_2O$) and 310 g. paraformaldehyde (95% $CH_2O$) were charged to a stirred autoclave. The mixture was heated to 140° F. and 50 ml. of aqueous ammonium hydroxide (28% $NH_3$) was added carefully through a pressurized buret. The temperature was raised to 255–260° F. and held for 2 hours. The highest recorded pressure was 100 p.s.i. The autoclave was cooled to room temperature and the contents were distilled to recover 50% unreacted acetone. The resultant solution contained 50% resin solids.

A particle board was prepared using an acetone-formaldehyde resin produced as aforedescribed and having a viscosity (Gardner-Holdt) of 3.4 seconds. The particle board was prepared by spraying aspen wood flakes with paraffin wax emulsion, in an amount of 1% wax, based on the weight of finished board, and with the resin solution (also containing 8 weight percent diethylenetriamine) in an amount of 7% resin, also based upon the weight of finished board. The sprayed wood flakes were matted in a forming bin and hot pressed to effect curing, for 15 minutes under pressure sufficient to produce a ½" board. The curing temperature was 350° F. Pertinent data and test results (ASTM Designation: D1037–60T) for water absorption and for tensile strength perpendicular to the surface (measuring internal bond strength) are set forth in Table I. Commercial standards are included for comparison.

Example 2

A particle board was prepared, using an acetone-formaldehyde resin produced as described in Example 1, having a viscosity (Gardner-Holdt) of 3.7 seconds. The particle board was prepared by spraying aspen wood flakes with paraffin wax emulsion, in an amount sufficient to deposit about one percent wax, based on the weight of the flakes. The flakes were then dried at 220° F. to a moisture content of below 6 percent. The treated flakes were then sprayed with the resin-containing solution (also containing 8 percent diethylenetriamine catalyst) in an amount of 7% resin, based upon the weight of finished board. The sprayed treated wood flakes were matted in a forming bin and hot pressed to effect curing, for 15 minutes under pressure sufficient to produce a ½" board. The curing temperature was 350° F. Pertinent data and test results (ASTM Designation: D1037–60T) for water absorption and for tensile strength perpendicular to the surface (measuring internal bond strength) are set forth in Table I. Commercial standards are included for comparison.

Example 3

A particle board was prepared as described in Example 2, except that a resin, produced as in Example 1 and having a Gardner-Holdt viscosity of 6.0 seconds (415 cs.), was used. Pertinent data and test results for the finished board (ASTM Designation: D1037–60T) for water absorption and for tensile strength perpendicular to the surface (measuring internal bond strength) are set forth in Table I. Commercial standards are included for comparison.

Example 4

A particle board was prepared, using an acetone-formaldehyde resin produced as described in Example 1 and having a viscosity (Gardner-Holdt) of 7.5 seconds. The particle board was prepared by spraying aspen wood flakes with paraffin wax emulsion in an amount sufficient to deposit about one-half percent wax, based upon the weight of the flakes. The flakes were then dried at 220° F. to a moisture content of below 6 percent. The treated flakes were then sprayed with the resin-containing solution (also containing 8 weight percent diethylenetriamine catalyst) in an amount of 7% resin, based upon the weight of finished board. The sprayed, treated wood flakes were matted in a forming bin and hot pressed to effect curing, for 15 minutes under pressure sufficient to produce a ½" board. The curing temperature was 400° F. Pertinent data and test results (ASTM Designation: D1037–60T) for water absorption and for tensile strength perpendicular to the surface (measuring internal bond staength) are set forth in Table I. Commercial standards are included for comparison.

Example 5

A particle board was prepared, using an acetone-formaldehyde resin produced as described in Example 1 and having a viscosity (Gardner-Holdt) of 9 seconds. The particle board was prepared by spraying aspen wood flakes with paraffin wax emulsion, in an amount sufficient to deposit about three percent wax, based upon the weight of the flakes. The flakes were then dried at 220° F. to a moisture content of below 6 percent. The treated flakes were then sprayed with the resin-containing solution (also containing 8 percent diethylenetriamine catalyst) in an amount of 7% resin, based upon the weight of finished board. The sprayed, treated wood flakes were matted in a forming bin and hot pressed to effect curing, for 15 minutes under pressure sufficient to produce a ½″ board. The curing temperature was 400° F. Pertinent data and test results (ASTM Designation: D1037–60T) for water absorption and tensile strength perpendicular to the surface (measuring internal bond strength) are set forth in Table I. Commercial standards are included for comparison.

TABLE I

|  | 1 | 2 | 3 | 4 | 5 | Standard |
|---|---|---|---|---|---|---|
| Density, #/ft.³ | 42 | 41 | 41 | 42 | 42 | 40–42. |
| Cure Cycle: |  |  |  |  |  |  |
| Temp., °F | 350 | 350 | 350 | 400 | 400 | ¹ 280–335. |
| Time, min | 15 | 15 | 15 | 15 | 15 | ¹ 6–8. |
| Resin Viscosity @77° F.: |  |  |  |  |  |  |
| Gardner-Holdt, sec | 3.4 | 3.7 | 6.0 | 7.5 | 9.0 |  |
| Kinematic, cs | 235 | 255 | 415 | 519 | 622 |  |
| Water Absorption Wt. Gain, percent | 21.4 | 11.9 | 11.9 | 15.0 | 14 | 15 max. |
| Internal Bond, p.s.i. | 40 | 74 | 80 | 102 | 120 | 70 min. |

¹ Standard practice, not a commercial requirement.

From the data in Table I, it will be noted that a board prepared by standard methods with a low-viscosity resin (Example 1) has a low resistance to absorption of water and substandard bond strength. On the other hand, boards prepared with a resin of similarly low viscosity, but in accordance with the method of this invention (Example 2), has enhanced resistance to absorption of water and excellent bond strength. With the use of a resin of ordinarily sufficient viscosity (5 or more seconds), boards prepared in accordance with the method of this invention have even higher bond strength and good resistance to absorption of water, as Examples 3, 4, and 5 demonstrate.

Example 6

A particle board was prepared, using an acetone-phenol-formaldehyde resin of the type described in copending application Ser. No. 354,435 and having a viscosity (Gardner-Holdt) of 4.8 seconds. The particle board was prepared by spraying aspen wood flakes with a heavy refined paraffin oil ("Nujol") in an amount sufficient to deposit about three percent oil, based on the weight of the flakes. The sprayed flakes were dried at 2° F. for 16 hours and then sprayed with the acetone-phenol-formaldehyde resin-containing solution (also containing 8 percent diethylenetriamine catalyst) in an amount of 7 percent resin, based on the weight of the finished board. The resin and oil-treated flakes were matted in a forming bin and hot pressed to effect curing, for 8 minutes under pressure which produced a board of 0.49 inch thickness. The curing temperature was 350° F. Pertinent data and test results (ASTM Designation: D1037–60T) for water absorption and for tensile strength perpendicular to the surface (measuring internal bond strength) are set forth in Table II.

Example 7

A particle board was prepared, using an acetone-phenol formaldehyde resin of the type described in copending application Ser. No. 354,435, and having a viscosity (Gardner-Holdt) of 5.2 seconds. The particle board was prepared by spraying aspen wood flakes with paraffin wax emulsion also containing sufficient diethylenetriamine resin-curing catalyst to deposit on the flakes an amount of the catalyst equal to 8% of the combined weight of the catalyst and the resin subsequently applied. The mixture of flakes, wax and resin-setting catalyst was dried at 220° F. for 16 hours, and then sprayed with the acetone-phenol-formaldehyde resin-containing solution in an amount of 7% resin, based on the weight of the finished board. The resin and flakes were matted in a forming bin and hot pressed for 8 minutes at 350° F. to effect curing. Pertinent data and test results (ASTM Designation D1037–60T) for water absorption and for tensile strength perpendicular to the surface (measuring internal bond strength) are set forth in Table II.

TABLE II

| Example | 6 | 7 |
|---|---|---|
| Density, #/ft.³ | 42 | 41 |
| Water absorption, Wt. gain, percent | 21 | 31 |
| Thickness swelling, percent | 13 | 17 |
| Internal bond, p.s.i. | 114 | 106 |

From the data in Table II, it can be seen that boards prepared by embodiments of the method of this invention, wherein a mineral oil is the water-repellent substance (Example 6) and the board-forming material is treated with a water-repellent substance and with a resin-setting catalyst prior to combining the board-forming material with the resin (Example 7), were characterized by good internal bond strength.

Example 8

A particle board was prepared, using an acetone-formaldehyde resin produced as described in Example 1 and having a viscosity (Gardner-Holdt) of 5.0 seconds. The particle board was prepared by drying aspen wood flakes (originally containing 108% moisture, based on weight of dry wood content) in a tumbling drum dryer at a temperature of 220° F. until the moisture content was reduced to 24% (dry wood basis). While the chips were still at the drying temperature of 220° F., they were sprayed with an aqueous emulsion containing 1% of parffin wax in an amount sufficient to deposit 0.5% wax, based on the weight of the flakes. Drying of the mixture of wax and flakes was continued in the tumbling drum dryer at 220° F. until moisture content of the mixture was reduced to 2% (dry wood basis). The treated flakes were then sprayed with the acetone-formaldehyde resin-containing solution (also containing 8 weight percent diethylenetriamine catalyst) in an amount of 7% resin, based on the weight of the finished board. The resin and wax-treated wood flakes were matted in a forming bin and hot pressed to effect curing for 15 minutes under pressure which produced a board of 0.47 inch thickness. The curing temperature was 400° F. Pertinent data and test results (ASTM Designation: D1037–60T) for water absorption and for tensile strength perpendicular to the surface (measuring internal bond strength) are set forth in Table III.

Example 9

A particle board was prepared, using an acetone-phenol-formaldehyde resin of the type described in copending application Ser. No. 354,435 and having a viscosity (Gardner-Holdt) of 5.0 seconds. The particle board was prepared by drying aspen wood flakes (originally containing 130% moisture, based on weight of dry wood content) in a tumbling drum dryer at a temperature of 220° F. until the moisture content was reduced to 24% (dry wood basis). While the chips were still at the drying temperature of 220° F., they were sprayed with an aqueous emulsion containing 1% paraffin wax in an amount sufficient to depositt 0.5% wax, based on the weight of the flakes. Drying of the mixture of wax and flakes was continued in the tumbling drum dryer at 220° F., until moisture content of the mixture was reduced to 2% (dry wood basis). The treated flakes were then sprayed with the acetone-phenol-formaldehyde resin-containing solution (also containing 8 weight percent diethylenetriamine catalyst) in an amount of 7% resin, based on the weight of the finished board. The resin and wax-treated wood flakes were matted in a forming bin and hot pressed to effect curing, for 6.5 minutes under pressure which produced a board of 0.49 inch thickness. The curing temperature was 400° F. Pertinent data and test results (ASTM Designation D1037–62T) for water absorption, Modulus of Rupture (MOR), and for tensile strength perpendicular to the surface (measuring internal bond strength) are set forth in Table III.

TABLE III

| Example | 8 | 9 |
|---|---|---|
| Density, #/ft.³ | 43.7 | 42 |
| Water absorption, Wt. gain, percent | 12.9 | 15.5 |
| Thickness swelling, percent | 10.7 | 10.7 |
| Internal bond, p.s.i. | 123 | 130 |
| MOR | 3,524 | 4,630 |
| 4-Hour Boil Test: | | |
|   Water Absorp., percent | 82 | 98 |
|   Thickness Swell, percent | 24 | 19 |
|   Internal Bond, p.s.i. | 91 | 98 |
| 6-Day Cycle Boil: | | |
|   Water Absorp., percent | 100 | 105 |
|   Thickness Swell, percent | 27 | 25 |
|   Internal Bond, p.s.i. | 56 | 87 |

In the 4-Hour Boil Test, a board specimen is placed in boiling water for 4 hours and oven-dried for 20 hours at 140° F. Then, it is retested for internal bond strength. In the 6-Day Cycle Boil, a board specimen is run through six boiling and drying cycles of the 4-Hour Boil Test and then, after the last 20-hour drying, tested for internal bond strength.

From the data in Table III, it will be noted that boards prepared with a ketone-aldehyde resin (Example 8), and with a ketone-aldehyde-phenol resin (Example 9), and in accordance with an embodiment of the method of this invention wherein a water-repellent substance is combined with the board-forming material during elevation of its temperature above the melting temperature of the water-repellent substance, were characterized by very high bond strength and excellent resistance to absorption of water.

*Bagasse board.*—The following examples demonstrate the preparation of composition boards from whole, undepithed bagasse. In Examples 10 and 11, the conventional method of applying wax to the fibers was employed. In the remaining examples, the method of this invention was used to pretreat the whole bagasse with wax. In preparing the boards of the examples, conventional commercial urea-formaldehyde and phenol-formaldehyde resins were used, as well as acetone-phenol-formaldehyde resins.

Example 10

Eleven hundred (1100) grams of ground whole bagasse (at 6–10% moisture content) was charged into the tumbling drum mixer. The oven dry weight of the bagasse was about 1040 grams. The atomizing nozzle was used to apply 10.4 grams of net wax emulsion (1% by weight) onto the bagasse fiber while the fiber was being rotated in the tumbling drum. The atomizing nozzle was then used to apply 94 grams of 65% solids urea-formaldehyde resin (9% by weight) while the fiber was being rotated in the tumbling drum. Matte moisture was determined and 990 grams of the treated bagasse fiber was manaully formed as a 12″ x 18″ matte onto a steel caul plate. The matte was pre-pressed (cold pressed) at 200 p.s.i. for five minutes and then hot pressed at 300° F. for 8 minutes. The resulting board was conditioned to 68°±6° F. and 65±2% relative humidity and tested according to ASTM D1037–62T. Pertinent data are set forth in Table IV.

Example 11

This board was made by the identical procedure as used in Example 10 except that a phenol-formaldehyde resin was used. The resin contained 40% solids. Because of resin dilution five-minute drying of the matte (in the tumbling drum) was required in order to eliminate excess water before hot pressing. The board was post cured for 48 hours at 210° F. to simulate hot stacking. Pertinent data are set forth in Table IV.

Example 12

Eleven hundred (1100) grams of ground whole bagasse (at 6–10% moisture content) was charged into the tumbling drum mixer. The oven dry weight of the bagasse was about 1040 grams. The atomizing nozzle was used to apply 424 grams of water (40% by weight) onto the bagasse fiber while the fiber was being rotated in the tumbling drum. Then 10.4 grams of net wax (1% by weight) were applied by atomizing nozzle as a 5% wax emulsion. The fiber was dried down to 2% moisture content to flux the wax over the surface of the fiber. Ninety-four (94) grams of phenol-formaldehyde resin (9% by weight) were applied as received as a 40% solution. Five-minute drying of the matte (in the tumbling drum) was required in order to eliminate excess water. Matte moisture was determined and 990 grams of the treated bagasse fiber was manually formed as a 12″ x 18″ matte onto a steel caul plate. The matte was pre-pressed (cold pressed) at 200 p.s.i. for five minutes and then pressed at 400° F. for 10 minutes. The resulting board was post cured at 210° F. for 48 hours to simulate hot stacking. The board was conditioned at 68°±6° F. and 65±2% R.H. and tested according to ASTM Method D1037–62T. Pertinent data are set forth in Table IV.

Examples 13 through 16

Boards were made with commercial phenol-formaldehyde resins under identical conditions as Example 12, with the following exceptions: (1) board density, (2) press cycle and (3) amount of resin solids used. Board properties are reported in Table IV.

Examples 17 through 22

Boards were made with acetone-phenol-formaldehyde resin prepared as described in Ser. No. 354,435, having a Gardner-Holt viscosity of 6, with similar process variations as stated above. Board properties are reported in Table IV.

TABLE IV

| Example No. | 10 | 11 | 12 | 13 | 14 | 15 | 16 | 17 | 18 | 19 | 20 | 21 | 22 |
|---|---|---|---|---|---|---|---|---|---|---|---|---|---|
| Resin Solids, percent | 9 | 9 | 9 | 9 | 9 | 9 | 9 | 9 | 9 | 9 | 7 | 9 | 9 |
| Press Cycle: ° F./min | 300/8 | 350/8 | 400/10 | 350/10 | 350/6.5 | 400/10 | 400/6.5 | 450/10 | 400/10 | 400/6.5 | 350/6.5 | 400/10 | 400/6.5 |
| Board Properties: | | | | | | | | | | | | | |
|   Density #/ft.³ | 46 | 45 | 40 | 42 | 37 | 48 | 48 | 40 | 40 | 38 | 43 | 48 | 48 |
|   Thickness, in. | .503 | .498 | .504 | .490 | .526 | .503 | .497 | .493 | .500 | .503 | .499 | .494 | .496 |
|   Water Absorp., percent | 25 | 31 | 27 | 25 | 38 | 26 | 13 | 27 | 24 | 25 | 29 | 23 | 23 |
|   Thickness Swell, percent | 30 | 21 | 16 | 14 | 21 | 13 | 6 | 10 | 10 | 11 | 16 | 14 | 14 |
|   Internal Bond, p.s.i. | 67 | 37 | 54 | 62 | 49 | 95 | 125 | 70 | 63 | 73 | 71 | 111 | 112 |
|   MOR, p.s.i. | 2,536 | 2,052 | 2,332 | 2,540 | 1,600 | 4,171 | 3,407 | 2,013 | 2,799 | 1,688 | 2,571 | 4,659 | 3,812 |
|   M. p.s.i. | 267 | 244 | 276 | 336 | 207 | 402 | 400 | 294 | 320 | 278 | 327 | 539 | 427 |
| 4 Hr. Boil: | | | | | | | | | | | | | |
|   Water Absorp., percent | (¹) | 110 | 111 | 93 | 160 | 91 | 79 | 73 | 95 | 113 | 97 | 52 | M |
|   Thickness Swell, percent | (¹) | 38 | 36 | 35 | 39 | 25 | 12 | 19 | 39 | 22 | 52 | 29 | 28 |
|   Internal Bond, p.s.i. | (¹) | 23 | 40 | 57 | 31 | 80 | 96 | 54 | 53 | 48 | 41 | 95 | 87 |
| 6 Day-Cycle Boil: | | | | | | | | | | | | | |
|   Water Absorp., percent | (¹) | 146 | 100 | 91 | 142 | 94 | 77 | 83 | 85 | 103 | 103 | 85 | 120 |
|   Thickness Swell, percent | (¹) | 63 | 38 | 34 | 47 | 27 | 16 | 22 | 22 | 23 | 56 | 32 | 34 |
|   Internal bond, p.s.i. | (¹) | 11 | 50 | 56 | 29 | | | 45 | 54 | 48 | 27 | 47 | 65 |

¹ No test.

Although the present invention has been described with preferred embodiments, it is to be understood that modifications and variations may be resorted to, without departing from the spirit and scope of this invention, as those skilled in the art, will readily understand. Such variations and modifications are considered to be within the purview and scope of the appended claims.

What is claimed is:

1. In a method for producing composition board comprising combining composition board-forming material with a thermosetting resin, molding the board-forming material, and curing said resin, the improvement that comprises pretreating the board-forming material with a water-repellent substance selected from the group consisting of silicone oils, petroleum oils, and water-insoluble wax and heating at an elevated temperature below about 250° F. for between about 10 minutes and about 24 hours to flux and uniformly distribute said substance on said material.

2. A method, as defined in claim 1, in which said composition board-forming material comprises cellulosic material.

3. A method, as defined in claim 2, in which said thermosetting resin comprises the product obtained by reacting a ketone having at least one hydrogen atom on each carbon atom alpha to the carbonyl group, an aldehyde, and a phenolic compound in the presence of a base.

4. A method, as defined in claim 3, in which said water-repellent substance is a water-insoluble wax.

5. A method, as defined in claim 2, in which said water-repellent substance is water-insoluble wax.

6. A method, as defined in claim 4, in which said cellulosic material is whole, un-depithed bagasse.

7. A method, as defined in claim 5, in which said cellulosic material is whole, un-depithed bagasse.

8. The composition board produced by the method defined in claim 6.

9. Composition board, as defined in claim 8, in which said composition board-forming material comprises cellulosic material.

10. Composition board, as defined in claim 9, in which said thermosetting resin comprises the product obtained by reacting a ketone having at least one hydrogen atom on each carbon atom alpha to the carbonyl group, an aldehyde and a phenolic compound in the presence of a base.

11. Composition board, as defined in claim 10, in which said water-repellent substance comprises a water-insoluble wax.

12. Composition board, as defined in claim 11, in which said cellulosic material is whole, un-depithed bagasse.

References Cited

UNITED STATES PATENTS

| 2,962,459 | 11/1960 | Ash et al. | 260—17.2 |
| 3,006,883 | 10/1961 | Cambron | 260—50 |
| 3,023,136 | 2/1962 | Himmelheber et al. | 260—17.2 |
| 3,133,031 | 5/1964 | Maxwell et al. | 260—17.3 |
| 3,152,940 | 10/1964 | Abel et al. | 156—157 |

FOREIGN PATENTS 655,689   8/1951   Great Britain.

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,410,813                                                            November 12, 1968

Craig C. Campbell et al.

It is certified that error appears in the above identified patent and that said Letters Patent are hereby corrected as shown below:

Column 9, line 42, "2° F." should read -- 220° F. --. Column 14, line 4, "Claim 6" should read -- Claim 1 --.

Signed and sealed this 10th day of March 1970.

(SEAL)
Attest:

Edward M. Fletcher, Jr.                                  WILLIAM E. SCHUYLER, JR.
Attesting Officer                                             Commissioner of Patents